(12) United States Patent
Pixley et al.

(10) Patent No.: US 6,697,239 B2
(45) Date of Patent: Feb. 24, 2004

(54) GROUND FAULT CIRCUIT INTERRUPTER FOR COAXIAL DROP CABLE AND METHOD OF OPERATION

(75) Inventors: Henry Pixley, East Syracuse, NY (US); Alper Ugur, Syracuse, NY (US); Ahmet Burak Olcen, Syracuse, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 11 days.

(21) Appl. No.: 10/160,770

(22) Filed: May 31, 2002

(65) Prior Publication Data

US 2003/0223160 A1 Dec. 4, 2003

(51) Int. Cl.[7] .................................................. H02H 3/18
(52) U.S. Cl. .............................. 361/42; 361/49; 361/79; 361/107
(58) Field of Search ............................. 361/42, 44, 46, 361/49, 54, 57, 78, 79, 80, 107, 87, 119; 324/512, 522, 525

(56) References Cited

U.S. PATENT DOCUMENTS

| 3,287,603 A | 11/1966 | Sosnoski | |
|---|---|---|---|
| 3,576,469 A | 4/1971 | McNitt | |
| 3,617,809 A | * 11/1971 | Penn et al. ..................... | 361/42 |
| 3,736,468 A | * 5/1973 | Reeves et al. ................. | 361/42 |
| 3,879,639 A | 4/1975 | Sircom | |
| 3,930,187 A | 12/1975 | Misencik | |
| 3,959,693 A | 5/1976 | Coley | |
| 4,053,815 A | * 10/1977 | Sircom ......................... | 361/42 |
| 4,099,217 A | * 7/1978 | Fitchew ........................ | 361/56 |
| 4,538,040 A | 8/1985 | Ronemus | |
| 4,553,085 A | 11/1985 | Canzano | |
| 4,567,544 A | 1/1986 | Ronemus | |
| 4,574,324 A | 3/1986 | Packard | |
| 4,771,355 A | 9/1988 | Emery | |
| 4,831,496 A | 5/1989 | Brant | |
| 4,914,382 A | * 4/1990 | Douville et al. ............. | 324/127 |
| 4,987,391 A | 1/1991 | Kusiak, Jr. | |
| 5,053,910 A | 10/1991 | Goldstein | |
| 5,185,685 A | 2/1993 | Tennies | |
| 5,202,662 A | 4/1993 | Bienwald | |
| 5,202,812 A | 4/1993 | Shinoda | |
| 5,216,569 A | 6/1993 | Brookhiser | |
| 5,363,047 A | * 11/1994 | Dresti et al. ................. | 324/510 |
| 5,526,213 A | * 6/1996 | MacLauchlan et al. ....... | 361/45 |
| 5,726,574 A | 3/1998 | Silverberg | |
| 5,739,999 A | * 4/1998 | Gruber et al. ................. | 361/56 |

(List continued on next page.)

Primary Examiner—Jonathan Salata
(74) Attorney, Agent, or Firm—Christopher R. Pastel; Hancock & Estabrook

(57) ABSTRACT

A protective system for reducing the possibility of injury to individuals or damage to electrical equipment due to a fault in a coaxial drop cable connected between a tap unit receiving both RF signals and AC power from a main distribution line and a premise unit coupling the RF signals to RF receiving equipment and the AC power to other AC powered equipment at user premises. The tap unit includes a circuit having a first line connected at spaced points to an inner conductor with the RF signals flowing through the inner conductor and the AC power flowing through the first line. A regulated monitoring current flows from an AC to DC converter in the first line to a difference amplifier having a pair of inputs with a resistor connected between the two, whereby the difference amplifier serves to monitor the monitoring current by measuring the voltage drop across the resistor. A comparator receives the output of the difference amplifier and actuates an AC switch to selectively pass or block AC power in accordance with values of the monitoring current falling within or outside predetermined limits indicative of no-fault and fault conditions of the cable. A circuit in the premise unit electrically isolates the premises equipment from the monitoring current and includes a second resistor which is used to set the limits of the monitoring current

8 Claims, 4 Drawing Sheets

U.S. PATENT DOCUMENTS

| | | | |
|---|---|---|---|
| 5,793,590 A | * | 8/1998 | Vokey et al. .................. 361/79 |
| 5,808,470 A | | 9/1998 | Adams, III |
| 5,990,687 A | | 11/1999 | Williams |
| 5,995,348 A | | 11/1999 | McCartan |
| 6,147,851 A | | 11/2000 | Anderson |
| 6,232,789 B1 | | 5/2001 | Schwindt |
| 6,385,030 B1 | * | 5/2002 | Beene ........................ 361/119 |
| 6,462,923 B1 | * | 10/2002 | Vokey ......................... 361/79 |
| 6,486,644 B1 | * | 11/2002 | Nemirow ..................... 323/285 |

* cited by examiner

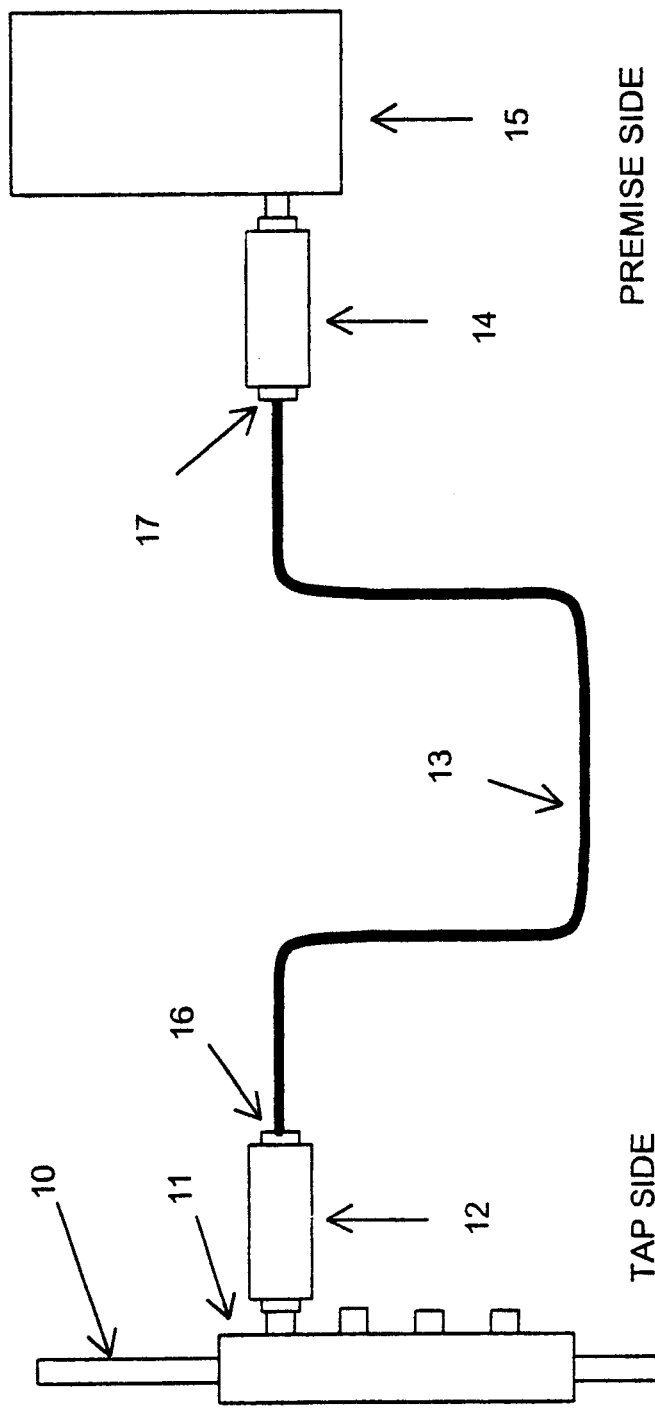
FIGURE 1.- APPLICATION

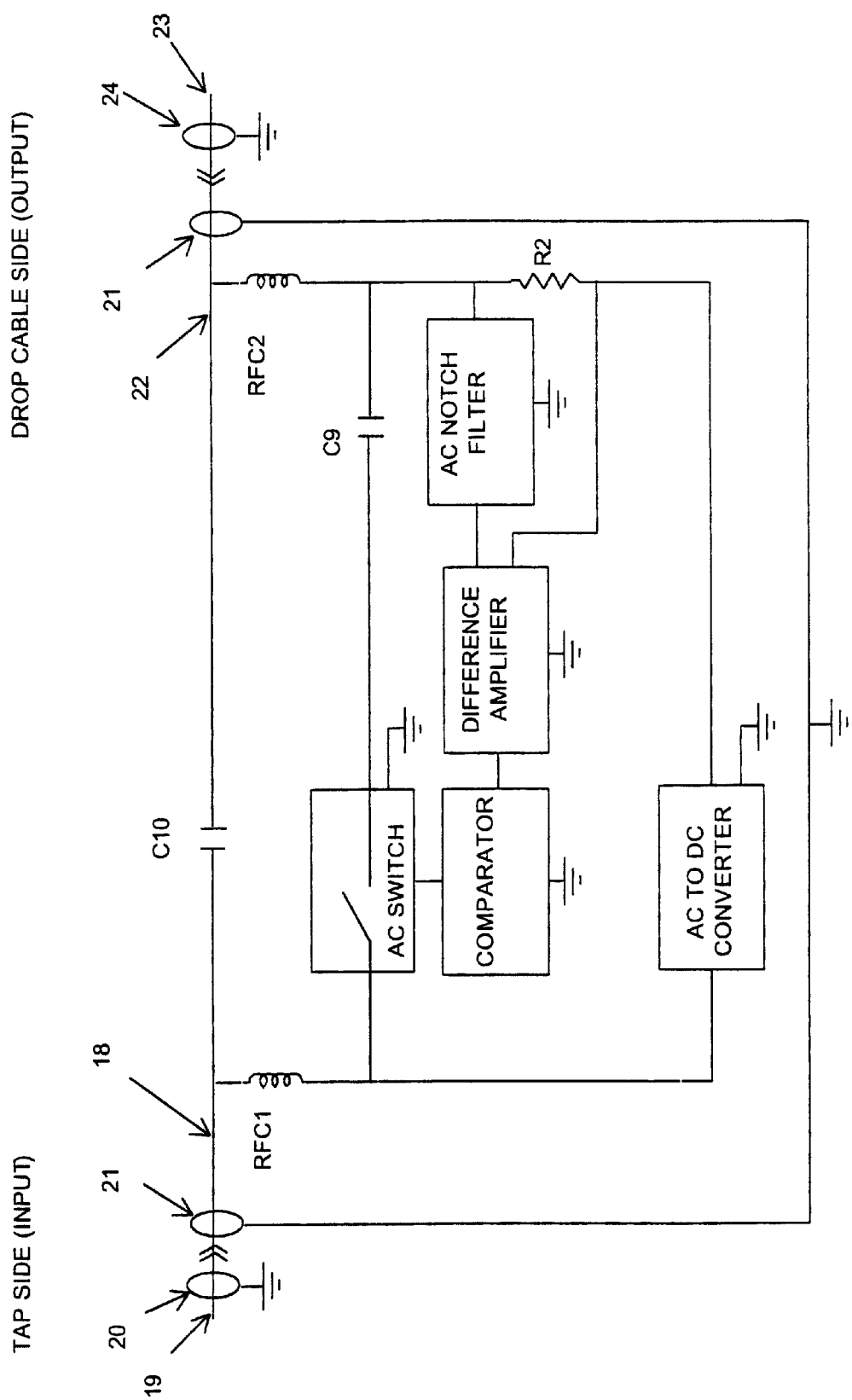
FIGURE 2. TAP UNIT, BLOCK CIRCUIT

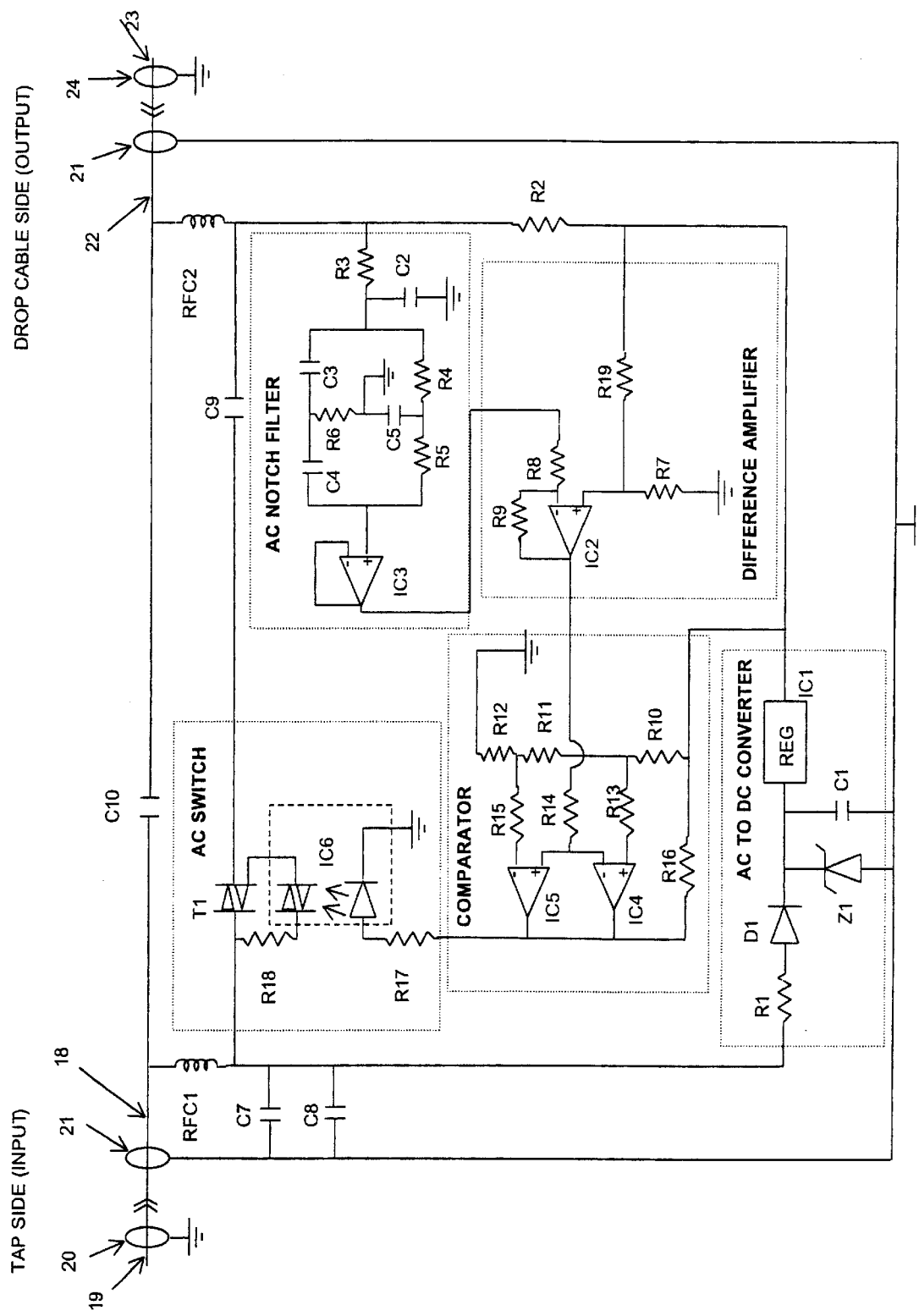
FIGURE 3. – TAP UNIT CIRCUIT

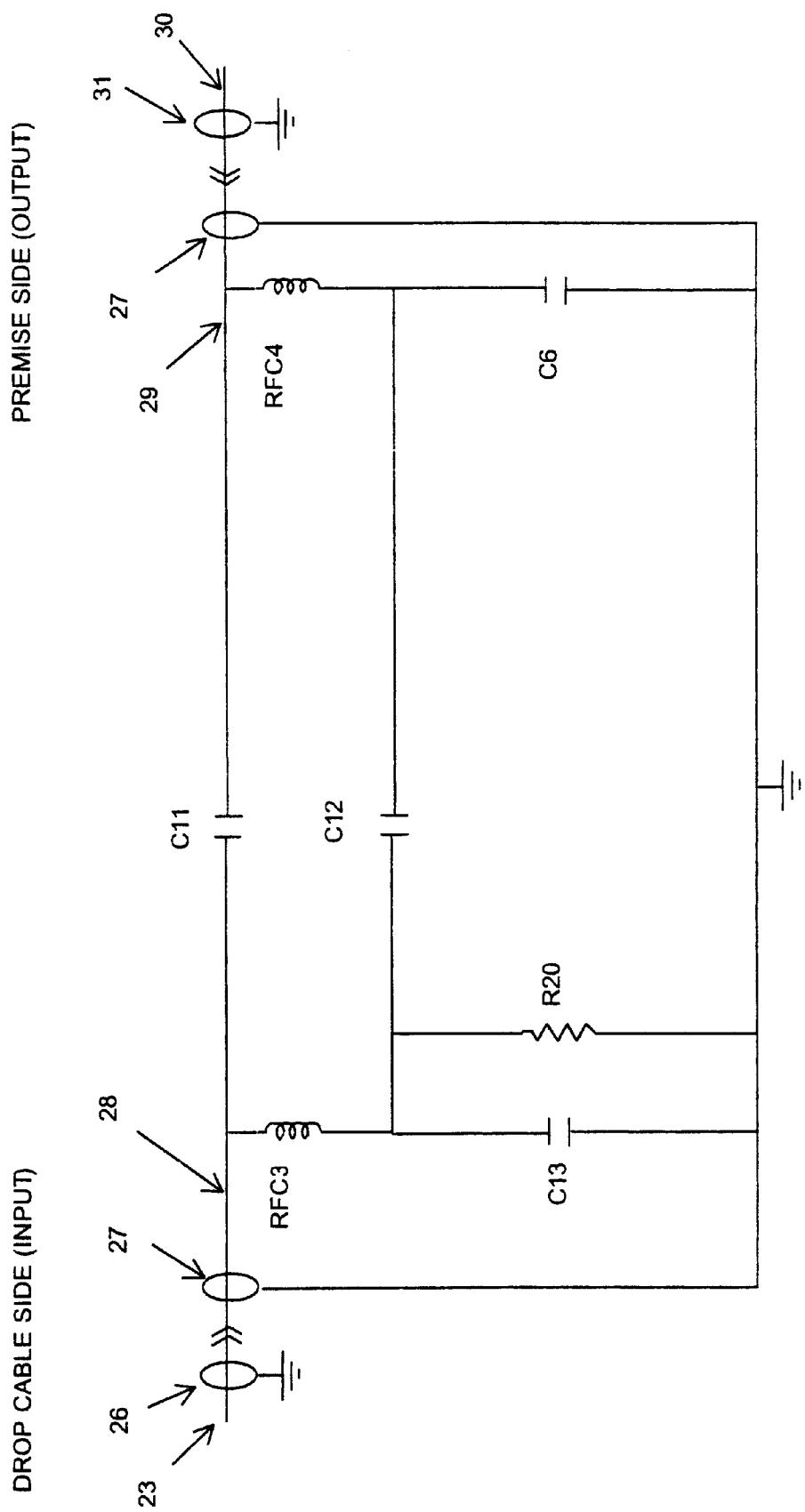
FIGURE 4.- PREMISE UNIT CIRCUIT

GROUND FAULT CIRCUIT INTERRUPTER FOR COAXIAL DROP CABLE AND METHOD OF OPERATION

FIELD OF THE INVENTION

The present invention relates to the field of consumer electronic product safety. More specifically, the invention relates to apparatus for detecting faults in a CATV coaxial cable carrying both RF signals and AC powering voltage to circuits and devices at subscriber premises, and for interrupting the circuit in response to such faults.

BACKGROUND OF THE INVENTION

Since the advent of community antenna television (CATV) many homes have been connected by a coaxial drop cable to an outside pedestal or other device where the cable receives RF broadcast signals. Typically, the drop cable is buried a few inches below the ground surface to protect it from lawnmowers, foot traffic, etc. More recently, with deregulation of the cable television and telephone industries, it has become feasible to provide two-way data and telephone services through the existing coaxial cables. The electronic circuits which separate and direct the television, data and telephone signals, as well as the telephone circuits and sets themselves, require electrical power for operation. The typical CATV distribution system is passive at the subscriber end, i.e., it does not provide power for operation of customer equipment.

Although power could be derived from the AC power supply at the subscriber end, this has the disadvantage of connection to mains power and, since telephony is regarded as a life-line service, the need for battery backup in case of power failure. Thus, it is economically preferable to use the existing drop cables to provide the home circuit powering. This raises another problem due to the fact that the cables are not buried deep enough to provide the necessary degree of safety for the level of power (typically, 90V AC) carried thereby. In order to avoid the relatively costly task of re-burying or replacing existing drop cables, it is preferable to provide apparatus which will detect an open circuit or faulted condition and disconnect the cable from the power source before causing significant equipment damage or personal injury.

The present invention provides novel and improved apparatus for detecting and responding to fault conditions in a powered CATV coaxial cable.

SUMMARY OF THE INVENTION

Prior art systems such as that disclosed in U.S. Pat. No. 5,793,590 provide protection systems based on monitoring the electrical resistance between the inner and outer cables. The present invention provides a protective circuit operable in response to detected changes in the current on either the inner or outer conductors of the coaxial cable. The change in current may be measured by any of a number of means, such as monitoring the level of magnetic flux generated from the current. Alternatively, as in the disclosed embodiment, a resistor of known value is placed in the line and the voltage drop across the resistor is measured, the current being calculated from Ohm's Law. In the event the cable is cut, the current on the powered conductor will approach zero. If the cable inner and outer conductors become electrically shorted, the current approaches infinity. In either case, the protective system of the invention triggers an electronic switch to open the circuit within an acceptably short time period.

The foregoing and other features of construction and operation of the invention will be more readily understood and fully appreciated from the following detailed disclosure, taken in conjunction with the accompanying drawings.

BRIEF DESCRIPTION OF THE DRAWINGS

FIG. 1 is a diagrammatic illustration of the physical connection of elements incorporating features of the invention in a buried CATV drop cable distribution system;

FIG. 2 is a block diagram of circuitry incorporated in one of the elements of FIG. 1;

FIG. 3 is an electrical schematic of the circuitry of FIG. 2; and

FIG. 4 is an electrical schematic of circuitry incorporated in another of the elements of FIG. 1.

DETAILED DESCRIPTION

The ground fault detector of the invention is shown in connection with conventional drop cable 13 which is buried, typically a few inches underground, for much of its length between what are termed tap and premise ends. The invention is employed in such installations wherein the cable carries not only RF signals but also AC powering voltages (typically 60 Hz) which exceed low voltage safety limits with the cable buried at shallow depths which fail to meet electrical safety codes.

The system comprises two units, namely, tap unit 12 and premise unit 14. The input of tap unit 12 is connected by RF tap 11 to the RF signals and AC power on main distribution line 10. The output of tap unit 12 is coupled to the tap end of drop cable 13 by coaxial cable connector 16. The input of premise unit 14 is coupled to the premise end of the drop cable by connector 17, and the output of the premise unit is connected to one or more items of electrically powered equipment represented by the block numbered 15.

A preferred embodiment of the circuitry of tap unit 12 is shown in block diagram and electrical schematic for in FIGS. 2 and 3, respectively. Inner conductors 18 and 19, are connected to one another, as are outer conductors 20 and 21, at the input of the tap unit. Likewise inner and outer conductors 22 and 21, respectively, at the output of tap unit 12 are connected to inner and outer conductors 23 and 24 of drop cable 13. Coupling capacitor C10 passes the RF signal from input to output of the inner conductor while blocking AC power on this line. RF chokes RFC1 and RFC2 block the RF signal from leaking into the detection circuitry to minimize loss of the RF signal.

Major elements of the detection circuitry are represented in FIG. 2 by the blocks labeled AC to DC Converter, AC Notch Filter, Difference Amplifier, Comparator, and AC Switch. These elements are also shown in FIG. 3 in detailed schematic form. AC power flowing through RF choke RFC1 is received through resistor R1 at the input to the AC to DC Converter. Diode D1, zener Z1 and capacitor C1 rectify the AC power to DC. Regulator IC1 receives the rectified AC power. The output of Regulator IC1 is a supply of regulated DC power which is used to generate the DC monitoring current on drop cable 13, and also used to power the other active components of the tap unit circuitry.

DC current from Regulator IC1 flows through monitoring resistor R2 and RF choke RFC2 to inner conductor 22 at the output end of tap unit 12, and thence to inner conductor 23 of drop cable 13. This current travels along the entire length of the drop cable inner conductor 23 to the premise end thereof where it is connected to inner conductor 28 of premise unit 14, as seen in FIG. 4. Within the premise unit circuit the DC current flows through RF choke RFC 3, and parallel connected capacitor C13 and resistor R20 to ground. The entire system, including tap unit 12, drop cable 13 and premise unit 14 provide the DC current monitoring circuit. Resistors R2 and R20 of the tap and premise units, respectively, are of preselected values and serve to establish the DC current level for the no-fault condition.

The DC current is monitored by measuring the current through resistor R2 using a Differential Amplifier comprising operational amplifier IC2 and resistors R7, R8, R9 and R19. An AC Notch Filter comprising resistor R3 in series with capacitor C2 to ground blocks AC power from going into the Difference Amplifier. The AC Notch Filter also includes a twin T notch filter consisting of resistors R4, R5 and R6, capacitors C3, C4 and C5 and operational amplifier IC3. The output of amplifier IC2 is applied to the input of a Comparator comprising operational amplifiers IC4 and IC5, and resistors R10, R11, R12, R13, R14, R15 and R16. The Comparator is used to compare the DC monitoring current to predetermined upper and lower limits which define the range of the no-fault condition, established by the values of resistors R10, R11 and R12. When the input to the Comparator is within the no-fault range or window, the Comparator output is of high voltage, which places the AC switch in the "on" or closed condition, allowing the AC power to pass from input to output of the tap unit. When the value of the voltage input to the Comparator is outside the established no-fault range, indicating the presence of a fault condition in the drop cable, the Comparator output becomes low, thereby activating the AC switch to the "off" condition, blocking passage of AC power to inner conductor 22 at the output of tap unit 12. The AC switch is formed by triac T1, opto-triac IC6, which drives triac T1, and resistors R17 and R18. If the inner and outer conductors of drop cable 13 become shorted or opened, the monitoring current through resistor R2 will increase or decrease, respectively, thus having a value higher or lower than the predetermined limits, thus causing the Comparator output to trigger opto-triac IC6 and turn the AC Switch to the "off" state. AC power is then prevented from flowing from the tap unit to the drop cable.

The circuitry of premise unit 14 is shown schematically in FIG. 4. As previously mentioned, the inner and outer conductors of the drop cable are connected to the inner and outer conductors at the input of the premise unit, and the output side of the premise unit is connected to equipment 15 of FIG. 1. Resistor R20 of the premise unit circuit cooperates with resistor R2 of the tap unit circuit to establish the monitoring current in the drop cable. Capacitor C11 is used to block the AC and DC power and pass the RF signal from input 28 to output 29 of the inner conductor of the premise unit circuit with minimal loss. RF chokes RFC3 and RFC4 block the RF signal from leaking to ground. The DC monitoring current will flow through RFC3 and resistor R20 to ground. Capacitor C12 blocks the DC current and also electrically isolates the premise equipment from the monitoring circuit. The AC power for equipment 15 flows from input 28 of the inner conductor, through RFC3, capacitor C12 and RFC4 to output 29. It should be noted that the tap unit could be used, if desired, to monitor the change in current along one leg of the circuit. That is, the system would be fully operable with a unit installed only at the tap end. The premise unit is preferably included to isolate the tap unit from spurious electrical spikes that could emanate from household appliances at the premises and propagate to the tap unit over the return line. Such spikes could cause unwanted triggering to the open state.

What is claimed is:

1. An electrical circuit for connection between a tap from a main distribution line and one end of a coaxial drop cable for carrying both RF signals and AC power from said tap to user premises, said circuit providing at least a portion of a protective system actuable to interrupt said AC power in response to a fault condition in said cable, said circuit comprising:

a) first inner and outer conductors for respective connection between corresponding inner and outer conductors of said tap and said drop cable;

b) a filter in said first inner conductor for permitting flow of said RF signals while blocking flow of said AC power through said first inner conductor;

c) fault monitoring circuitry including a first line connected to said first inner conductor at first and second points on opposite sides of said filter for carrying said AC power;

d) an AC to DC converter having an input connected to said first point and a regulator having an output carrying a monitoring current having a value representing said fault condition;

e) a difference amplifier having a first input connected to said regulator output, a second input and an output;

f) a resistor connected between said first and second inputs of said difference amplifier, whereby said difference amplifier output is commensurate with the voltage drop across, and thus the value of said monitoring current through, said resistor;

g) a comparator having an input connected to said difference amplifier output, and an output responsive to said fault condition value of said monitoring current; and h) an AC switch connected in said first line between said first and second points, said switch having first and second states permitting and preventing flow of said AC power through said first line in response to an output of said comparator reflecting a value of said monitoring current indicating a no-fault and a fault condition, respectively, of said drop cable.

2. The circuit of claim 1 wherein said filter is a capacitor.

3. The circuit of claim 1 and further including an AC notch filter having an input connected to said second point and to said resistor between said resistor and said difference amplifier second input, whereby said notch filter blocks AC power from being applied to said difference amplifier.

4. The circuit of claim 3 wherein said notch filter includes a twin T notch filter having a plurality of resistors and capacitors and an operational amplifier.

5. The circuit of claim 3 wherein said difference amplifier comprises a plurality of resistors and an operational amplifier.

6. The circuit of claim 1 wherein said AC switch comprises a triac.

7. The circuit of claim 6 wherein said AC switch further comprises an opto-triac having an input connected to said comparator output and an output for driving said triac.

8. The circuit of claim 1 and further comprising a first RF choke in said first line connected on one said to said first point and on the other side to said AC switch, and a second RF choke in said first line connected on one side to said AC switch and on the other side to said second point, whereby said RF chokes block said RF signal from leaking into said first line to minimize loss of the RF signal.

* * * * *